United States Patent [19]

Morton et al.

[11] Patent Number: 5,052,042
[45] Date of Patent: Sep. 24, 1991

[54] METHOD AND APPARATUS FOR USING MICROFILM FOR DATA INPUT INTO A COMPUTER

[75] Inventors: Roger R. A. Morton, Penfield; Wesley J. Micket, Rochester; Wayne K. Shaffer, Churchville, all of N.Y.

[73] Assignee: Eastman Kodak Company, Rochester, N.Y.

[21] Appl. No.: 686,832

[22] Filed: Apr. 17, 1991

Related U.S. Application Data

[63] Continuation of Ser. No. 296,116, Jan. 12, 1989, abandoned.

[51] Int. Cl.$^5$ .............................................. G06K 9/00
[52] U.S. Cl. ..................................... 382/1; 353/26 A; 382/56
[58] Field of Search ................... 382/1, 10, 47, 56, 59; 353/25, 26 R, 26 A

[56] References Cited

U.S. PATENT DOCUMENTS

| | | | |
|---|---|---|---|
| 3,140,466 | 7/1964 | Greanin et al. | 340/146.3 |
| 3,177,469 | 4/1965 | Chow | 340/146.3 |
| 3,347,981 | 10/1967 | Kagan et al. | 382/56 |
| 3,718,908 | 2/1973 | Bloomstein | 340/149 A |
| 3,885,096 | 5/1975 | Inuiya | 382/59 |
| 4,097,846 | 6/1978 | Lewis | 382/47 |

Primary Examiner—David K. Moore
Assistant Examiner—Joseph Mancuso
Attorney, Agent, or Firm—Dennis R. Arndt

[57] ABSTRACT

The invention relates to a system that uses human readable microfilm to store information and retrieve that information for later use in a computer. The microfilm is put into a Computer Input Microfilm (CIM) Reader that scans the film and converts the characters or text in the image into computer codes. An Optical Character Recognition algorithm is used to identify the text character and the CIM Reader converts that character into a computer code.

7 Claims, 4 Drawing Sheets

METHOD AND APPARATUS FOR USING MICROFILM FOR DATA INPUT INTO A COMPUTER

This ia a continuation of application Ser. No. 07/296,116 filed Jan. 12, 1989, now abandoned.

TECHNICAL FIELD OF THE INVENTION

The present invention relates to the use of microfilm as a computer data storage media and more particularly, concerns the use of microfilm for data input in a data processing system.

BACKGROUND ART

The continuing development of high density data storage and retrieval systems has seen the expansion and refinement of digital data processing systems which may incorporate magnetic or optical digital storage components as part of an overall system.

A problem associated with these types of retrieval systems is that after a period of time, the equipment used to generate the information is no longer available. As a result, the stored information can no longer be retrieved and for all practical purposes, lost.

Human readable media means a storage media that stores information that can be read and understood by a person without the data having to be translated. Conversely, electronic media requires the use of a computer system or electronic system to read the information from the media, process the information and display it in human readable format.

Paper is an example of human readable media. The information stored on the paper can be read by a person directly, without processing or translating the data. However, paper's bulk and high cost of storage along with the difficulty of retrieving information in that format and the non-archival nature of this medium leaves much to be desired, with information loss due to physical deterioration of the medium a strong likelihood.

On the other hand, microfilm has proven to be a very desirable storage media. Information stored on microfilm, in human readable format is archival when the proper types of microfilms are used and the information is capable of being stored indefinitely. Information stored in human readable form on microfilm can always be retrieved with simple equipment such as a magnifying lens.

Microfilm can be easily and quickly duplicated using optical methods and at a higher speed than most other storage media. Optical duplication is done by placing the original in contact with the copy film and then passing light through the two films while in contact. This type of duplication is equivalent to a massive parallel data transfer in electronics, which is presently not yet practical.

In the past, there did not exist a way for providing for human readable media as a computer backup. Any human readable media requires a human operator to hand type the information into a computer. Alternatively, the data could be stored on both an electronic readable form such as magnetic tape and paper. Such duplication is costly to create and store.

DISCLOSURE OF THE INVENTION

According to the invention, human readable archival microfilm is used for both the storage and retrieval of computer data. The original data is feed to a Computer Output Microfilmer (COM) which outputs the data in human readable form on microfilm for archival storage. When needed, the data can be retrieved by a Computer Input Microfilmer (CIM) which converts the stored information from human readable form (characters) into computer data such as ASCII, EBCDIC or equivalent code.

BRIEF DESCRIPTION OF THE DRAWINGS

In the detailed description of the preferred embodiment of the invention presented below, reference is made to the accompanying drawings, in which.

MODES OF CARRYING OUT THE INVENTION

Figure 1:
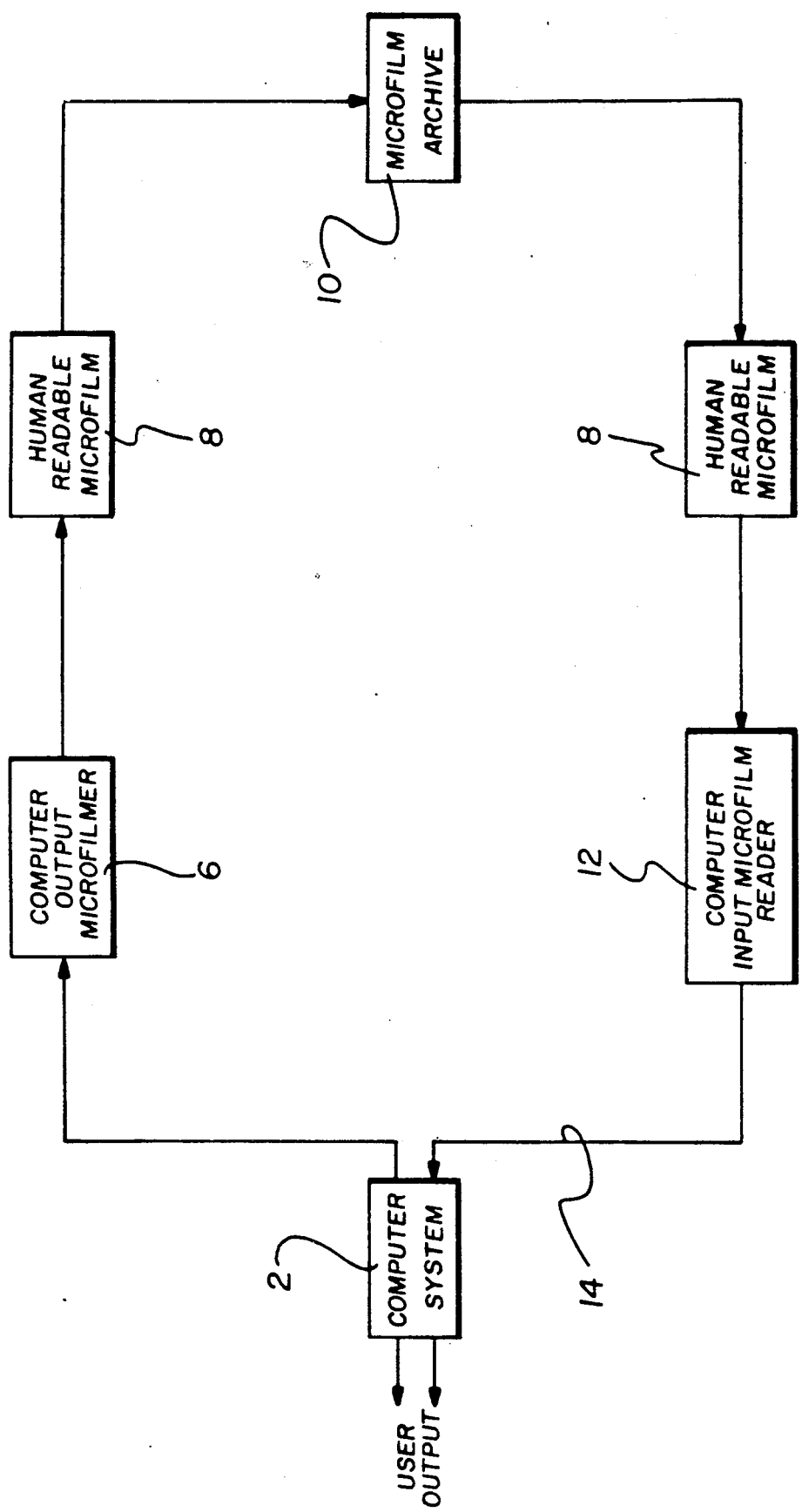
FIG. 1 is a block diagram illustrating the use of a Computer Input Microfilmer in a computer system in accordance with the present invention.

With reference now to FIG. 1, there is shown a combined block diagram of a system according to the invention. Computer data processing systems 2 generate large amounts of data that must be stored for possible later retrieval. The usefulness of storing data in the computer system varies with the age of the data. It is less useful to store old data in a computer system because it is only rarely needed. This older data is referred to as "archival data", which cannot be lost, but which does not require frequent access.

Data of this type is transmitted to a Computer Output Microfilmer 4 either on line or via magnetic tape off line. The Computer Output Microfilmer 4 writes or outputs that data on microfilm 6 in human readable characters. The Computer Output Microfilmer 4 could take the form of a KODAK KOMSTAR TM IV Microimage Processor, a registered trademark of, and manufactured by the Eastman Kodak Company. Other COM's could also be used such as the Datagraphix DATAMASTER, NCR 6500 as well as other commercially available COM's. The only requirement placed on the COM unit used is that it places the data on the microfilm in a uniform legible font. In fact, it is difficult and unusual to find a COM that will print multiple fonts. Use of a COM with a single reduction ratio would be less costly than using one with multiple reduction ratios which also increases the cost and complexity of the Computer Input Microfilm Reader to be discussed later. However, such a feature would allow the use of higher reduction ratios resulting in more compact data storage. It is very important that the reduction ratio for the COM must match the reduction ratio of the CIM.

It should be understood that the information that is stored on the microfilm is in human readable form. This means the information consists of characters just like the characters on this page. The data or information does not consist of data in a digital representation. If it were digital, it would be stored as binary data that would be written on the film as a sequence of small spots. These spots would be very small (approximately the size of the spots used to store data on an optical disk). The data would not be readable, except by a special reading device, that would detect the spots and convert the information into the appropriate signals for processing in a computer.

The microfilm generated by the COM is stored in a microfilm archive 10. This may either be manual or automatic like the Auto Loader manufactured by Eastman Kodak for use in the KODAK IMAGE MANAGEMENT SYSTEM ™, a registered trademark of Eastman Kodak Company. The information on the microfilm can now be retrieved by use of either a standard microfilm reader or a fully automatic retrieval system.

Information on the microfilm 8 can be retrieved by the computer system when a need to access the archived information occurs. The correct piece of microfilm 8 may be retrieved manually or automatically. The selected microfilm, either roll film or fiche may be taken to the Computer Input Microfilm Reader 12. Computer Input Microfilm Reader 12 to be discussed in detail below, reads the human readable information and converts it into the appropriate computer code. The information now in the form of computer data is fed via line 14 back into the computer system 2.

Figure 2:
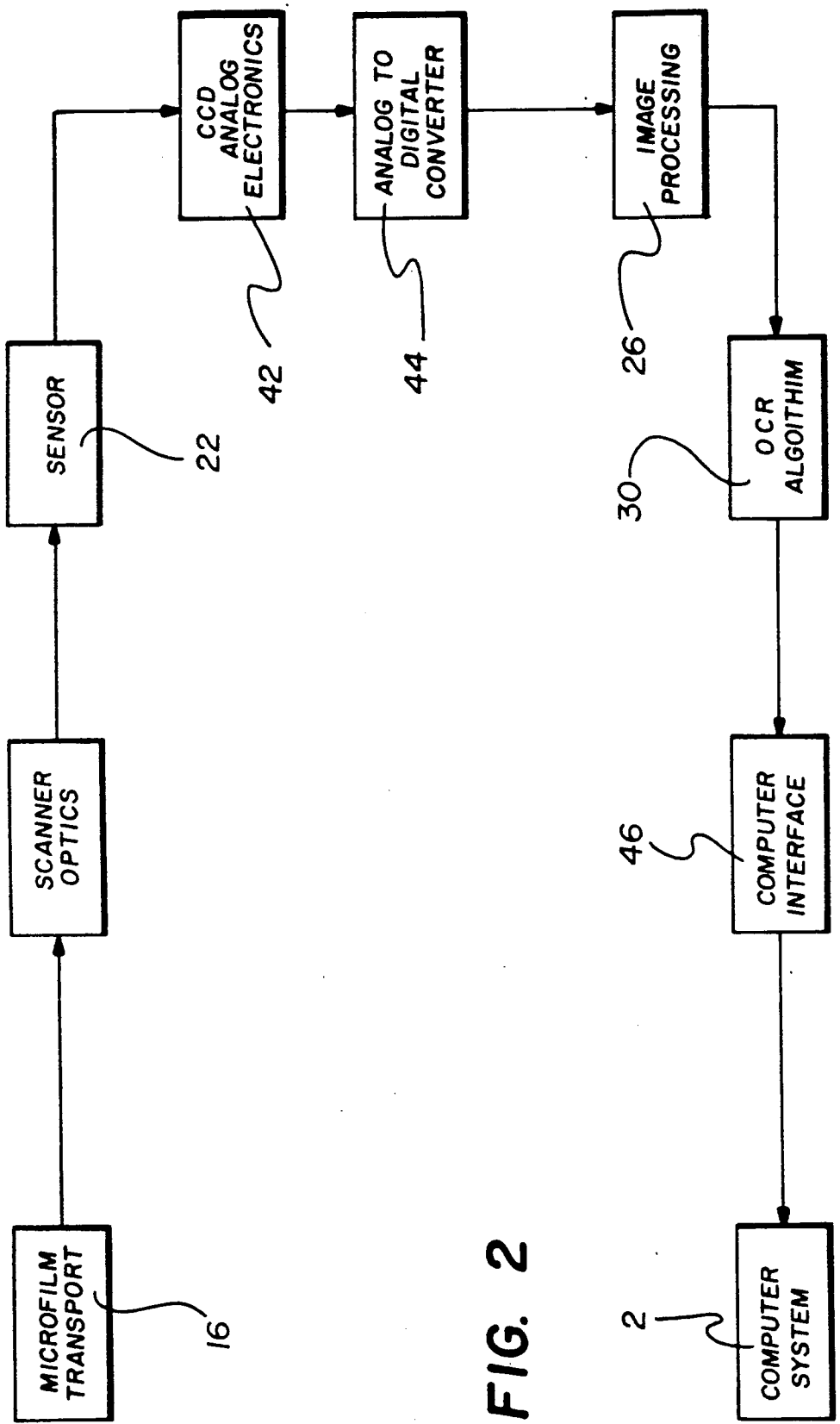
FIG. 2 is a block diagram of the Computer Input Microfilmer.
Figure 3:
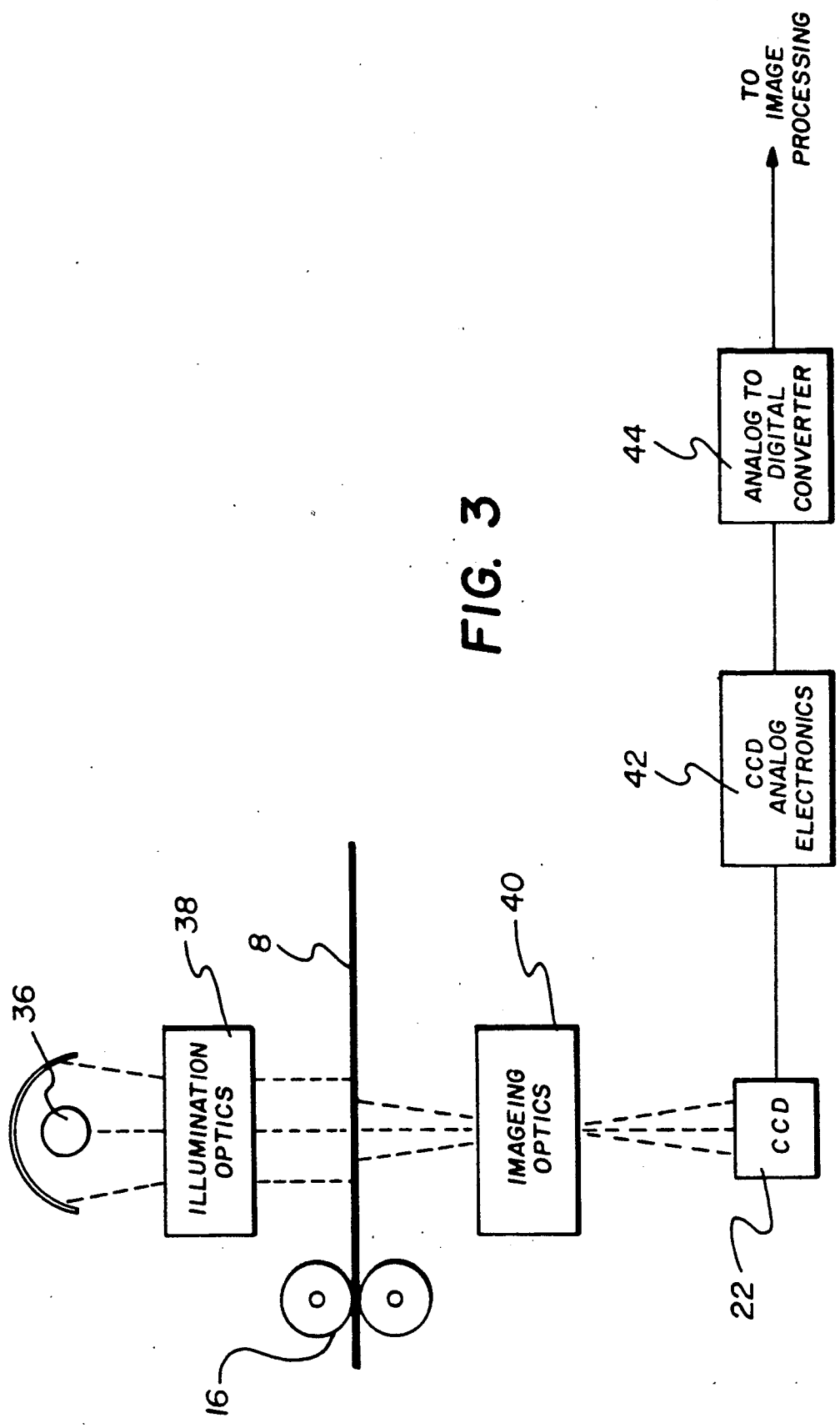
FIG. 3 is a schematic diagram of the film scanner.

The Computer Input Microfilm Reader 12 shown in FIGS. 2 and 3 converts information stored on microfilm 8 as human readable characters into computer data. Microfilm 8 is inserted into the microfilm transport 16. The microfilm transport consists of the mechanisms and control electronics needed to position the microfilm 8 in the scanner 18. Commands from the operator or computer causes microfilm transport 16 to position the correct portion of microfilm 8 in the scanner 18. In the preferred embodiment of this invention, the positioning information is supplied by the computer system. The computer system maintains an index of the data, which allows the computer system to transmit the location of the desired data to the CIM. In one embodiment, the microfilm 8 could be in the form of fiche. Accordingly, transports like the ones shown in U.S. Pat. Nos. 4,540,257; 4,493,540; 4,487,488; 4,487,487 and 4,483,600 could be used to correctly position the film. Microfilm in the form of roll film and could use a transport like that shown in U.S. Pat. Nos. 3,743,400; 3,941,978; 3,708,677; and 3,802,771.

The scanner 18 comprises a light source 36 and the necessary illumination optics 38 and imaging optics 40, forms an image from microfilm 8 on a sensor 22 such as a CCD linear array.

Light source 36, takes the form of a lamp. The illumination optics 38 is used to collimate the light and direct it onto film 8. Additionally, the light can be filtered at this point to remove unwanted components. An example of such filtering could be the removal of the infrared component from the light provided by a tungsten source. Illumination optics 38 will also insure that light energy is evenly distributed on the surface of the film area being scanned. The illuminating light could be further conditioned by diffusion if scratch suppression is required. The area of the film being illuminated is in the form of a line or slit to accommodate the shape of the CCD array 22. The light passes through film 8, and where there is high film density, very little light passes through the film and conversely, low film density areas allow more light to pass through.

The light passing through the film is captured by the imaging optics 40 which forms an image on the surface of linear CCD array 22. The light and dark areas of the film image are now represented by various intensities of light striking individual photosites on linear CCD array 22. The CCD array 22 converts the incident light energy into an analog signal. The level of electrical energy created is proportional to the incident light energy impinging on CCD array 22. This analog signal is transferred to the CCD Analog Electronics 42.

CCD Analog Electronics 42 includes all the clocking and control functions necessary to operate the CCD and produce an output signal representative of the light input. These clocking and control functions transfer the analog signal from the CCD in an orderly fashion. This orderly transfer maintains the relationship between the information on the film and the electrical signal.

CCD Analog Electronics 42 takes the level of electrical energy in the CCD, and converts it into a voltage. Accordingly, the voltage produced is directly proportional to the light falling on the photosites (not shown) on CCD array 22. The output signal of the CCD is amplified to provide adequate output and filtered to eliminate noise before being sent to the Analog to Digital Converter 44.

Analog to Digital Converter 44 takes the output voltage signal from CCD Analog Electronics 42 and converts the output voltage signal into a number of digital signals. The digital signals produced represent the magnitude of the input voltage at a given time period, as a binary number. Thus, it can be seen that the binary number is proportional to the light energy that was incident on the CCD photosites. Accordingly, the light energy incident at the photosites is directly proportional to the density on film 8, such that the binary number represents the density at a particular point on film 8.

This scanning process is repeated for each line on the film's surface. The next scan line is initiated by moving the film or alternatively, moving the CCD array to the next line required to be scanned. The image may also be moved using a mirror (not shown). Such technology is fully described in U.S. Pat. No. Re. 32,137. U.S. Pat. Nos. 3,753,240 and 4,190,899 describe scanning mechanisms particularly suited in scanning microfiche.

The electronic signal produced by the sensor 22 as mentioned earlier, is an analog representation of the microfilm image. There is a correspondence between the voltage output of the sensor and the light energy incident thereon. This correspondence is maintained for each of the discrete elements called "photosites" that make up the of sensor 22. The photosites measure the density of very small areas of the microfilm. Each of these areas is a "picture element", or "pixel". By measuring each of these "pixels", as described above, a complete electronic representation of the image on the microfilm can be obtained.

Analog to Digital Converter 44 which converts the analog representation of the microfilm image into digital image data transmits the digital image data to the image processing electronics 26. The image processing electronics enhances the image. Image enhancements comprises noise reduction, edge enhancement, and image quantization. Such enhancements facilitate the character recognition process in the Optical Character Recognition (OCR) algorithm 30. Image quantization converts the digital image data to a "bit map". A "bit map" is a digital image where each pixel is represented by one bit.

OCR algorithm 30 converts the digital image data received from image processing electronics 26 into computer codes. The algorithm must perform the following functions: (1) locate lines of characters contained in the digital representation of the image; (2) it must then locate the characters contained in the lines;

(3) then, it must identify the characters that it has located.

Figure 4:
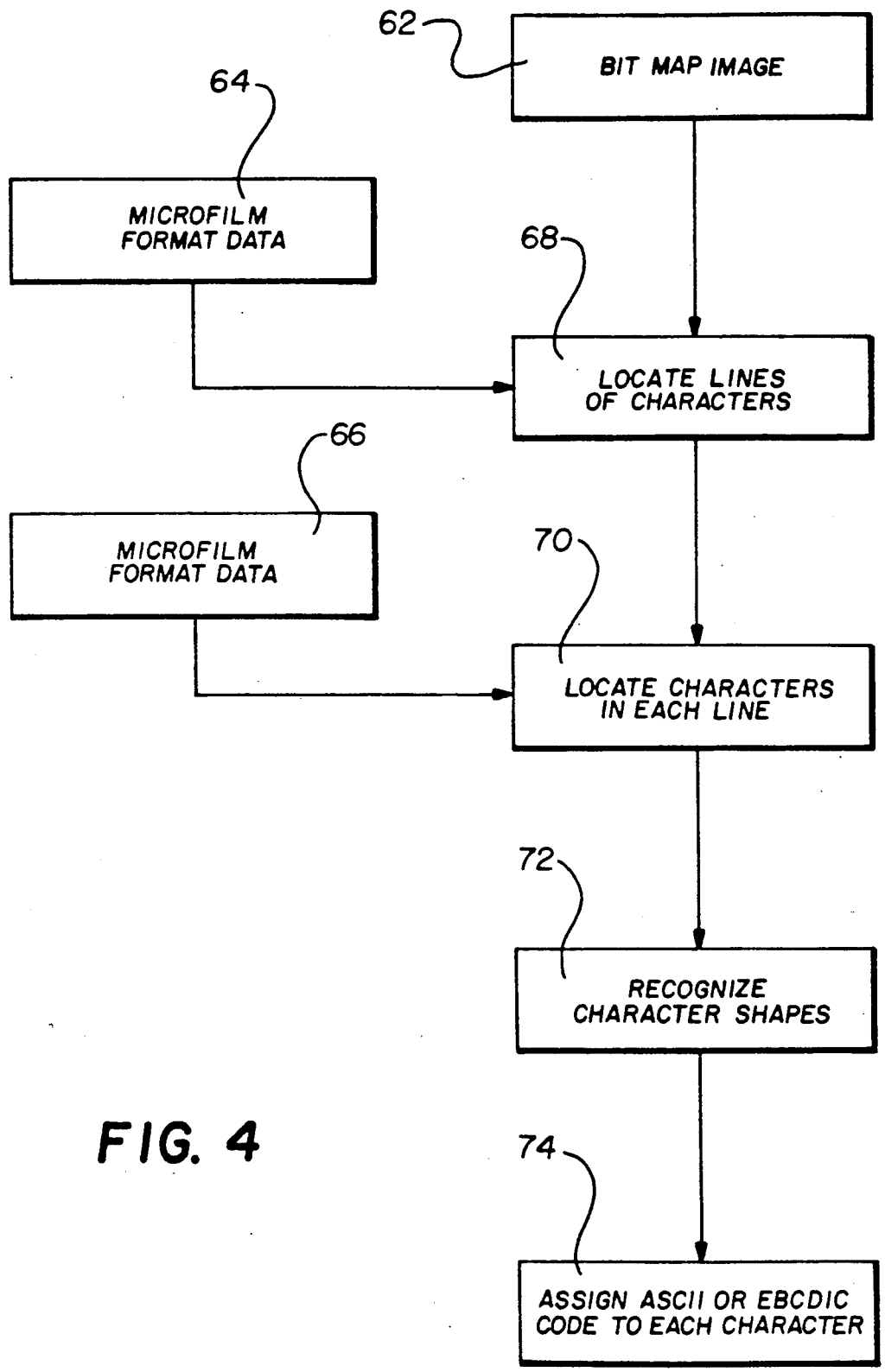
FIG. 4 is a flowchart of the basic OCR operation used in the Computer Input Microfilmer.

FIG. 4 illustrates a flow chart for the basic OCR process. The process begins with a Bit Map Image as set forth in block 62, which is a "picture" of the information. It is the characters or text material in this picture that contain the useful information that was originally part of the microfilm image. The algorithm will extract the human-readable characters from the bit map and convert the characters or text material into computer readable codes like ASCII or EDCDIC. An example of suitable technology to perform the function just described is shown in U.S. Pat. Nos. 3,873,972; 4,700,400; 4,773,099; and 4,769,849.

It is necessary that either an operator or the computer controlling Computer Input Microfilm Reader 12 will provide the required Format Data to the reader or retrieval device.

In the preferred embodiment of this invention, this format data is stored in the computer system. The format data is stored as part of the index to the data recorded on the microfilm.

Apparatus that may be used to retrieve and read both fiche and roll film can be found in U. S. Pat. Nos. 3,429,436; 3,629,840; 3,751,152; 3,802,771; 3,941,978; 4,273,427; and 4,616,126.

Computer Input Microfilm Reader 12 receives information from either an operator or controlling computer giving the location on the microfilm of the data to be read by. Such position or format information (block 64, FIG. 4) will be used by OCR algorithm 30 to improve the accuracy of the algorithm. Information identifying the font (block 66) that is to be read will also be supplied. This information about the font type significantly enhances the accuracy of the algorithm.

Algorithm 30 locates the lines of characters according to block 68 in the bit map image based on the information supplied. The algorithm "knows" or is directed to where the data is supposed to be located. Also, the location of any graphic elements like boxes, lines, symbols, letterheads, etc. contained in the bit map image is supplied. The information as to where the data and graphical elements are located allows algorithm 30 to avoid any graphic elements. It is quite common that these elements are used with a computer output microfilmer (COM) 6. They may be placed on the film image on the film either directly, using the same imaging system used for text or may be placed on the film separately using a form slide. These graphic elements are used to enhance readability. Deleting them from the microfilm would be disadvantageous.

As mentioned earlier, in this embodiment, algorithm 30 uses information previously supplied. Such information could have specified the character spacing associated with the font used. This information helps locate characters in each line in accordance with block 70. Based on font data, algorithm 30 will locate the character in each line as per block 70. Character shape block 72 will use font data to enhance the recognition accuracy. This is particularly important if the characters are extremely close together or actually touching. The font information is important because it is difficult for an algorithm to recognize two touching characters or to determine if a broken character is one or two characters. Knowing the nominal spacing between the characters can significantly improve the accuracy of this process.

Once the characters are located, algorithm 30 will convert the bit map of the character into the corresponding computer code, in accordance with block 74 (FIG. 4). The process that algorithm 30 performs is similar to the human reading process, where the reader looks at a series of shapes as representing a particular type of animal, such as a "cat". Once the font type is known, there is a substantial reduction in possible matches for each pattern. However, if the font type is not known, the algorithm must consider whether each pattern is a letter in a series of different fonts. This makes recognition very difficult because the variation from one font to another can be significant. In addition, the algorithm must contend with "damaged characters" that contain additional features caused by dirt, or missing features caused by other errors. Once the character is recognized, the appropriate computer code is assigned.

OCR algorithm 30 has a significant advantage over most other OCR applications because of its prior knowledge relating to the layout of the characters and the shapes (type font) of those characters. Because the algorithm does not have to allow for the possibility of shapes associated with unused fonts, OCR algorithm 30 can therefore deal more effectively with imperfectly shaped characters.

Note that these advantages are gained only because the entire operation runs "closed loop". Computer Output Microfilmer 16 creates images with a limited number of fonts. Computer input microfilmer 12 is designed to read the COM generated fonts. This is a system approach where all steps or stations are part of the same organization. Accordingly, this allows the user of the system to print onto microfilm and then be able to reliably retrieve the information at a later date.

This situation contrasts with the problems associated with trying to retrieve information from microfilm images of documents. Documents consist of information stored on paper. Microfilmed documents are generated by an unknown system that uses fonts and formats that are not compatible with the system presently used.

Retrieving information from documents that were produced by an outside source would create one or more of the following problems. A wide variability in type fonts would most likely exist. Document types would vary widely and the information would not be consistently placed on the document. In addition, non COM generated microfilm can have variations in the location of the document image on the film. Capturing the image of a document onto microfilm photographically does not provide the same degree of precise registration that results from a COM generated image.

As shown in FIG. 2, the output of OCR algorithm 30 from the Computer Input Microfilm Reader 12 is the computer codes that correspond to the text characters originally on microfilm 8. These computer codes generated by OCR algorithm 30 are transmitted to computer interface 46. Computer interface 46 formats the computer codes into the appropriate data blocks for transmission to computer system 2. Computer interface 22 also implements the necessary control and required handshake functions.

ADVANTAGES AND INDUSTRIAL APPLICABILITY

Use of the present invention provides apparatus that allows the use of human readable microfilm as a backup store for computer data. Additionally, the use of a Computer Input Microfilm Reader in the system allows for rapid data input from the microfilm archive, without requiring a human operator to input the data using a keyboard.

The invention is useful in information retrieval and storage, and use of such a technique renders microfilm more compatible with the electronic office and computer environment.

The use of microfilm for data storage also lessens the danger of data loss due to vandalism. Unlike magnetic storage means, which can be erased or modified, microfilm storage provides permanent storage of data. Computer vandalism that can erase or corrupt data is often called a "virus".

What is claimed is:

1. An information data retrieval system comprising:
   a computer system accessible to provide information to a user;
   a computer output microfilmer for converting computer data into human readable characters and printing said characters on microfilm in a known font and format;
   archival means for storing microfilm images generated by said computer output microfilmer and information identifying addresses of the images in said archival means;
   means for retrieving a selected image on request from said archival means;
   a computer input microfilmer including an optical character recognition algorithm for converting human readable characters on microfilm into computer codes wherein said optical character recognition algorithm is optimized to detect characters written in said known font and format; and
   computer interface means for receiving said computer codes to said computer system.

2. The invention as set forth in claim 1 wherein said computer readable code is an ASCII code.

3. The invention as set forth in claim 1 wherein said computer readable code is an EBCDIC code.

4. The invention as set forth in claim 1 wherein said computer input microfilmer includes a scanning means comprising a two dimensional CCD array.

5. The invention as set forth in claim 1 wherein said computer input microfilmer includes a scanning means comprising a flying spot scanner.

6. The information data retrieval system as set forth in claim 1 wherein said archival means further includes indexing means that contains information identifying the location on microfilm of the archived data.

7. The archival means as set forth in claim 6 wherein said indexing means further includes information as to the format of microfilm images stored in said archival means.

* * * * *